US010893261B2

(12) United States Patent
Ninan

(10) Patent No.: US 10,893,261 B2
(45) Date of Patent: Jan. 12, 2021

(54) POSITIONAL ZERO LATENCY

(71) Applicant: Dolby Laboratories Licensing Corporation, San Francisco, CA (US)

(72) Inventor: Ajit Ninan, Sunnyvale, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 30 days.

(21) Appl. No.: 16/209,445

(22) Filed: Dec. 4, 2018

(65) Prior Publication Data

US 2019/0174125 A1    Jun. 6, 2019

Related U.S. Application Data

(60) Provisional application No. 62/595,544, filed on Dec. 6, 2017.

(51) Int. Cl.

| H04N 13/383 | (2018.01) |
| H04N 5/369 | (2011.01) |
| H04N 13/194 | (2018.01) |
| H04N 13/139 | (2018.01) |
| H04N 13/161 | (2018.01) |
| G01S 3/00 | (2006.01) |
| H04N 21/81 | (2011.01) |
| H04N 21/2343 | (2011.01) |
| H04N 13/178 | (2018.01) |

(52) U.S. Cl.
CPC ............ *H04N 13/383* (2018.05); *G01S 3/00* (2013.01); *H04N 13/139* (2018.05); *H04N 13/161* (2018.05); *H04N 13/178* (2018.05); *H04N 13/194* (2018.05); *H04N 21/23439* (2013.01); *H04N 21/234345* (2013.01); *H04N 21/816* (2013.01)

(58) Field of Classification Search
CPC ........................ H04N 13/383; H04N 5/3696
USPC .................................................. 375/240.26
See application file for complete search history.

(56) References Cited

U.S. PATENT DOCUMENTS

| 2017/0045941 A1* | 2/2017 | Tokubo ................... G06F 3/167 |
| 2017/0285736 A1* | 10/2017 | Young ..................... G06F 3/013 |
| 2017/0316264 A1* | 11/2017 | Gustafsson .......... G02B 6/0008 |
| 2018/0059780 A1* | 3/2018 | Mitchell ................. G06F 3/013 |
| 2018/0081178 A1 | 3/2018 | Shpunt |
| 2018/0136720 A1* | 5/2018 | Spitzer ................... G09G 5/391 |
| 2018/0189958 A1* | 7/2018 | Budagavi ............... H04N 21/84 |
| 2018/0293752 A1 | 10/2018 | Ninan |
| 2019/0079302 A1 | 3/2019 | Ninan |
| 2019/0104309 A1 | 4/2019 | Su |
| 2019/0139296 A1 | 5/2019 | Lakshman |

* cited by examiner

*Primary Examiner* — Jeffery A Williams

(57) ABSTRACT

Based on viewing tracking data, a viewer's view direction to a three-dimensional (3D) scene depicted by a first video image is determined. The first video image has been streamed in a video stream to the streaming client device before the first time point and rendered with the streaming client device to the viewer at the first time point. Based on the viewer's view direction, a target view portion is identified in a second video image to be streamed in the video stream to the streaming client device to be rendered at a second time point subsequent to the first time point. The target view portion is encoded into the video stream with a higher target spatiotemporal resolution than that used to encode remaining non-target view portions in the second video image.

19 Claims, 12 Drawing Sheets

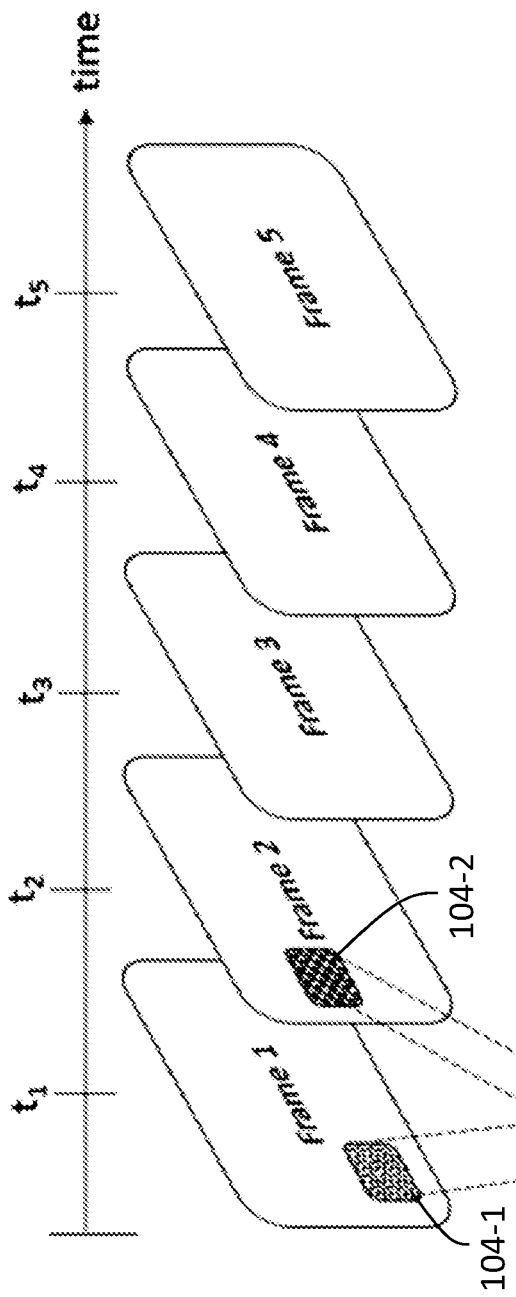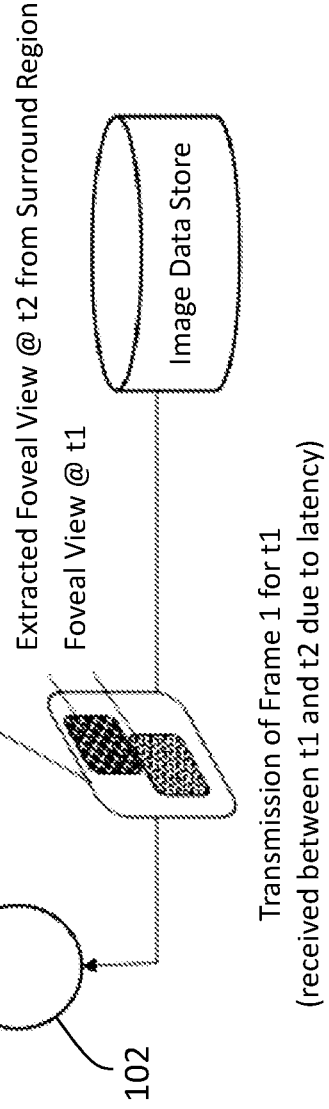
FIG. 1

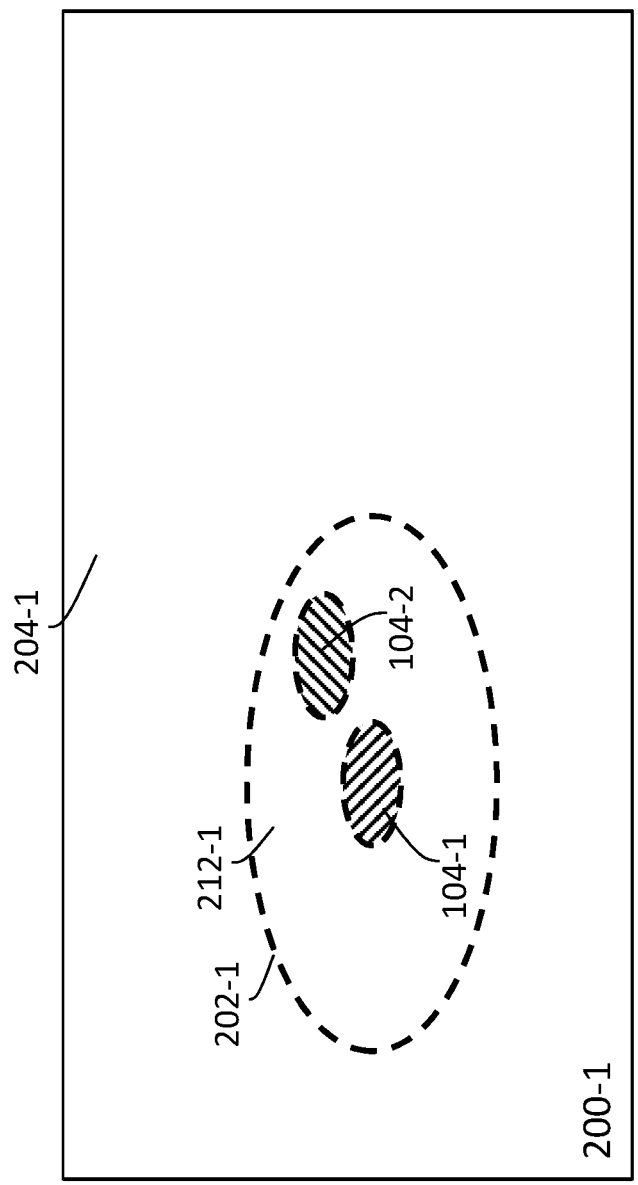

based on viewing tracking data, determine a target view direction of a viewer 402 identify, based on the target view direction of the viewer, a target view portion in a second video image 404 encode the target view portion into a video stream with a target spatiotemporal resolution higher than that used to encode remaining non-target view portions outside the target view portion 406 transmit the target view portion and the remaining non-target view portions 408

FIG. 4A

```
┌─────────────────────────────────────────────┐
│ decode, before a first time point, a first video │
│      image from a video stream 452          │
└─────────────────────────────────────────────┘
                      │
┌─────────────────────────────────────────────┐
│ while rendering the first video image at the first │
│   time point, collect viewing tracking data 454  │
└─────────────────────────────────────────────┘
                      │
┌─────────────────────────────────────────────┐
│ send, before a second time point, the viewing │
│  tracking data to a video streaming server 456 │
└─────────────────────────────────────────────┘
                      │
┌─────────────────────────────────────────────┐
│ decode, from the video stream, a second video │
│   image comprising a target view portion and  │
│   remaining non-target view portions 458      │
└─────────────────────────────────────────────┘
                      │
┌─────────────────────────────────────────────┐
│ cause the the second video image to be rendered │
│        at the second time point 460           │
└─────────────────────────────────────────────┘
```

POSITIONAL ZERO LATENCY

CROSS-REFERENCE TO RELATED APPLICATIONS

This application claims the benefit of priority from U.S. Patent Application No. 62/595,544 filed Dec. 6, 2017, which is hereby incorporated by reference in its entirety.

TECHNOLOGY

The present invention relates generally to display images, and in particular, to rendering display images with positional zero latency for augmented reality (AR), virtual reality (VR), mixed reality (MR), and so forth.

BACKGROUND

To support low latency image rendering in video applications in which a viewer can freely move the viewer's view position and direction, high speed connections (e.g., optical data connections, local wired connections, etc.) may need to be provisioned to support transmitting a large amount of image data to the viewer's client device (e.g., a head-up display, a wearable device, a headset, etc.) in a very short time interval such as well within a frame interval (e.g., less than 8 milliseconds, etc.). This could cause the viewer's client device in the video applications to have too much external wiring and to be too bulky, to be accommodated in a small footprint of a wearable device.

Wireless networks can be used to stream image data to a client device. The amount of image data that can be transmitted to the client device with a very short time delay or latency, however, is significantly constrained. Tracking, and informing a server of, the viewer's field and view position also takes time. A round trip time delay from a first time point at which the viewer's view position and direction is measured and a second time point at which the viewer's client device eventually renders imagery generated/selected based on the viewer's previously measured view position and direction can be so significant as to seriously affect the immersive quality of the viewer's experience with the video applications.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 1 illustrates an example sequence of video images transmitted/streamed from an upstream device to a client device of a viewer;

FIG. 2A through FIG. 2C illustrate example video images encoded with differential spatiotemporal resolutions.

FIG. 4A and FIG. 4B illustrate example process flows; and

DESCRIPTION OF EXAMPLE EMBODIMENTS

Figure 2B:
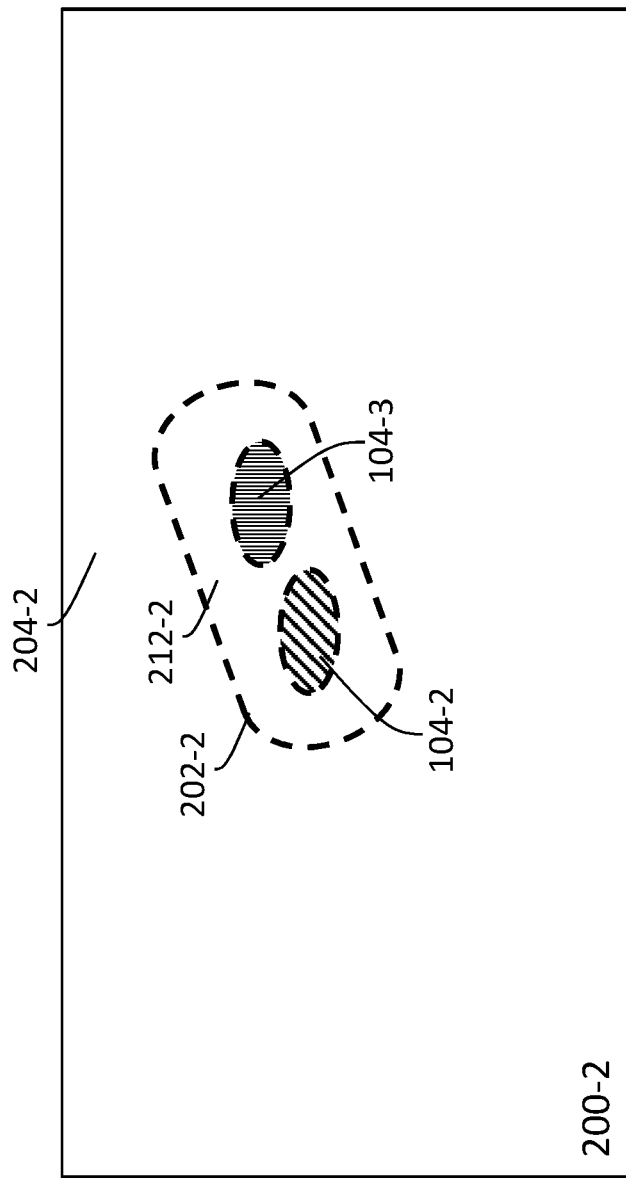

Example embodiments, which relate to rendering display images with positional zero latency for AR, VR, MR, and so forth, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. POSITIONAL ZERO LATENCY
3. VIDEO IMAGE SEQUENCE WITH POSITIONAL ZERO LATENCY
4. SURROUND REGIONS
5. VISION FIELD
6. 3D AND MULTIVIEW IMAGES
7. STREAMING SERVER AND CLIENT
8. EXAMPLE PROCESS FLOWS
9. IMPLEMENTATION MECHANISMS—HARDWARE OVERVIEW
10. EQUIVALENTS, EXTENSIONS, ALTERNATIVES AND MISCELLANEOUS

1. General Overview

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

A time delay exists between an upstream device in a video application receiving viewpoint data from a client device of a viewer and the client device rendering images that were generated by the upstream device based on the viewpoint data. Correspondingly, a mismatch exists between a viewpoint as represented in the viewpoint data that was used to generate the images and a viewpoint used by the viewer to view the images rendered after the time delay.

Under some approaches, the viewer's viewpoint has to be received and determined by the upstream device first. The viewer's viewpoint is then used by the upstream device to generate the images with the viewer's viewpoint to a scene depicted in the images and to subsequently stream back the generated images to the client device through multiple image frame buffers and network links.

By the time the client device is ready to render the generated images based on the previously sent viewpoint data, the viewer or the client device may have already moved to a new view position and a new view direction. As a result, when the images generated based on the previously sent viewpoint data are rendered and viewed by the viewer at the newly moved view position/direction, there is a mismatch between the view position/direction represented in the images rendered and the viewer's newly moved view position/direction.

Techniques as described herein can be implemented by an upstream device to send sufficient image data generated based on previously sent viewpoint data to account for any translation and rotation of the viewer's view position and direction that can occur before the image data is rendered at a client device at a later time.

Under these techniques, images generated based on previously sent viewpoint data are rendered with the viewer's newly moved view position/direction with positional zero latency, as if the images are seen from the viewer's newly moved view position/direction. The term "positional zero latency" means that, while a video image is generated at a previous time point and rendered or displayed to a viewer with a time delay (or timewise non-zero latency) at a present time point, the video image as rendered at the present time point is adjusted, interpolated and/or rendered to the viewer's present view position and view direction at the present time point, as if the video image rendered at the present time point is seen from the viewer's present view position and view direction at the present time point, with no time delay (or positional zero latency for the present view position and view direction).

More specifically, a video image as described herein, whether a multiview image or not, that is sent to the client device from the upstream device comprises a target view portion and remaining non-target view portions. A target view portion includes not only a foveal view corresponding to a previous viewpoint as indicated in the most recently received viewing tracking data, but also a surround region that covers new possible foveal views that a viewer may have moved to before the image data is rendered.

The target view portion is coded with a relatively high spatiotemporal resolution, whereas the remaining non-target view portions are coded with relatively low spatiotemporal resolutions.

Since the target view portion is relatively small as compared with the entire vision field of the viewer or the entire viewport supported by a display device operating in conjunction with the client device, the data volume of the target view portion is relatively small, notwithstanding that the target view portion is encoded with the relatively high spatiotemporal resolution.

In addition, since the remaining non-target view portions are encoded with the relatively low spatiotemporal resolutions, the data volume of the non-target view portions is also relatively small, notwithstanding that the non-target view portion may be relatively large in spatial size.

The target view portion with the surround region outside of the foveal view of the previous viewpoint of the viewer can be used to enable the client device to render or recreate a new foveal view associated with the viewer's new view position/direction with a minimal amount of work and/or a minimal amount of error right before rendering the video image.

Under techniques as described herein, the video image is still created and received with a time delay by the client device. However, despite the video image is still rendered behind in time, the video image is rendered with the viewer's contemporaneous foveal view—which is extracted from the surround region of the target view portion of the video image—of the viewer's contemporaneous viewpoint at the time of rendering, rather than with the viewer's previous viewpoint used by the upstream device to generate the image data. As a result, the viewer sees the video image with a high-quality foveal view and a correct (or contemporaneous) viewpoint.

In most if not all operating scenarios, the viewer can be presented in the viewer's foveal view with high-resolution video content for a seamless viewing experience that is relatively free from visual artifacts, physiological discomforts, etc., associated with some other approaches that do not adopt the techniques as described herein. The visual artifacts, physiological discomforts, etc., associated with the other approaches may include, but are not necessarily limited to, any of: prolonged lags in transitioning to high resolution imagery as perceived by the human vision, low resolution imagery noticeable within a central viewing area of the human vision, mismatches between a user's natural vision-related intuition and video content as actually rendered to the user, sudden drop of visual clarity in imagery when a viewer moves viewing angles, perceptible slow transitioning from low resolutions to high resolutions, showing fuzzy images for previously occluded image details when a viewer moves viewing angles, depicted objects in a scene still moving when the viewer starts taking a stationary viewpoint, etc.

Example embodiments described herein relate to streaming video data. Based on viewing tracking data received from a streaming client device after a first time, a target view direction of a viewer is determined in relation to a three-dimensional (3D) scene depicted by a first video image (a) that has been streamed in a video stream to the streaming client device before the first time point and (b) that has been rendered with the streaming client device to the viewer at the first time point. Based on the target view direction of the viewer, a target view portion is identified in a second video image to be streamed in the video stream to the streaming client device before a second time point subsequent to the first time point and to be rendered at the second time point. The target view portion in the second video image is encoded into the video stream with a target spatiotemporal resolution higher than a non-target spatiotemporal resolution used to encode remaining non-target view portions in the second video image that are outside the target view portion. The second video image comprising the target view portion encoded with the target spatiotemporal resolution and the remaining non-target view portions encoded with the non-target spatiotemporal resolution via the video stream is transmitted to the streaming client device.

Example embodiments described herein relate to presenting video data to viewers. a first video image is decoded, before a first time point, from a video stream. The video stream is streamed by a video streaming server. While rendering the first video image at the first time point on a display device to a viewer, viewing tracking data based on which a target view direction of a viewer in relation to a three-dimensional (3D) scene depicted by the first video image is to be determined is collected. The viewing tracking data is sent, before a second time point subsequent to the first time point, to the video streaming server. A second video image is decoded, before the second time point, from the video stream. The second video image comprises a target view portion with a target spatiotemporal resolution higher than a non-target spatiotemporal resolution used to encode remaining non-target view portions in the second video image that are outside the target view portion. The target view portion in the second video image was identified by the streaming server based on the target view direction of the viewer determined from the viewing tracking data sent to the video streaming server before the second time point. At least a part of the target view portion in the second video image is caused to be rendered, at the second time point, on the display device to the viewer.

In some example embodiments, mechanisms as described herein form a part of a media processing system, including but not limited to any of: cloud-based server, mobile device, virtual reality system, augmented reality system, head up display device, helmet mounted display device, CAVE-type system, wall-sized display, video game device, display device, media player, media server, media production system, camera systems, home-based systems, communication devices, video processing system, video codec system, studio system, streaming server, cloud-based content service system, a handheld device, game machine, television, cinema display, laptop computer, netbook computer, tablet computer, cellular radiotelephone, electronic book reader, point of sale terminal, desktop computer, computer workstation, computer server, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Positional Zero Latency

Under techniques as described herein, to substantially reduce the amount of image data in video images to be transmitted from an upstream device to a client device of a viewer and to be rendered by the client device at a subsequent time with positional zero latency, a video image can be partitioned by the upstream device such as a video streaming server into a target view portion and remaining non-target view portions. Example video image as described herein may include, but are not necessarily limited to only, any of: a multiview image, an omnidirectional image, a panoramic image, an image with a wide field of views, a non-multiview image, a non-panoramic image, and so forth. The partition of the video image is based on the most recently received—by the upstream device—viewing tracking data collected while the client device is rendering a previous video image to the viewer at an earlier time point.

The target view portion of the video image covers not only the most recently determined foveal view—as determined by the upstream device—in the viewer's vision field at the earlier time, but also a (non-foveal-view) surround region outside the most recently determined foveal view of the viewer. The most recently determined foveal view may be established by the upstream device based on the viewer's view position and direction as most recently determined by the upstream device from the most recently received viewing tracking data—as received by the upstream device—collected by the viewer's client device at the earlier time.

The surround region in the target view portion of the video image can be purposely chosen to cover (e.g., predicted, all, most probable, etc.) potential foveal views of the viewer's vision field at the subsequent time. For example, the spatial extent of the surround region can be determined or spatially delineated (in 2D or 3D images) by a dynamic function based upon (i) a variable transmission latency time (dependent on communication links in between the streaming server and the client device) and a maximal traversal distance of the viewer's foveal view during such latency time, and/or (ii) prediction modeling for the viewer's eye gaze, based on a velocity in eye gaze movement and/or an expected eye gaze displacements/destination (e.g., eye gaze heading toward a region of interest).

The target view portion of the video image may be encoded with a (e.g., much higher, 1.5 times, twice, five times, etc.) higher spatiotemporal resolution in a video stream from the streaming server to the viewer's client device than the non-target view portions of the same video image.

At the subsequent time when the video image is to be rendered, the viewer may have already moved to a new view position and a new view direction that is different from the viewer's view position and direction as most recently determined by the upstream device from the most recently received viewing tracking data collected by the viewer's client device at the earlier time.

Under techniques as described herein, at the subsequent time, even though the viewer's new different foveal view at the subsequent time does not match the viewer's foveal view at the earlier time, the client device can extract relatively high-quality image data for the viewer's new different foveal view from the target image portion encoded with the higher spatiotemporal resolution, adjust/interpolate the extracted image data to the viewer's new different viewpoint, and render some or all of the video image with relatively high-quality image data in the viewer's new different foveal view as seen from the viewer's new different perspective, without waiting for the upstream device to deliver a high quality foveal-view image portion in a video image generated based on the new different view position and the new different view direction at the subsequent time after the upstream device receives a new viewing tracking data portion informing the new different view position and the new different view direction.

Thus, the client device can render the video image with high-quality imagery in the viewer's new different foveal view with zero latency in time, notwithstanding that the video image was encoded before the upstream device receives the new viewing tracking data that can be used to determine the new different foveal view. It is true that generating and sending the video image from the upstream device to the client device still incur a time delay (e.g., within a frame interval, within two frame intervals, etc.). However, under techniques as described herein, there is no or little time delay (e.g., positional zero latency, zero-time delay, just in time, etc.) in showing image details with a relatively high spatiotemporal resolution in the viewer's present foveal views, wherever the viewer has already moved the viewer's vision field. As a result, techniques as described herein provide a better immersive quality to the viewer's user experience, as compared with other approaches that do not implement the techniques as described herein.

3. Video Image Sequence with Positional Zero Latency

FIG. 1 illustrates an example sequence of video images (denoted as "Frame 1," "Frame 2," "Frame 3," "Frame 4," "Frame 5," etc.) that are generated from source images retrieved from an image data store by an upstream device (not shown) such as a streaming server and that are transmitted/streamed from the upstream device to a client device (not shown) of a viewer (102). In some embodiments, some or all of the video images and/or the source images may be multiview images. In some embodiments, some or all of the video images and/or the source images may be non-multiview images.

Each of the source images from the image data store may be of relatively high spatiotemporal resolutions, and may have an amount of image data that may be too large to be transmitted from the upstream device to the client device in a relatively short time.

Each of the video images as generated by the upstream device and as received by the client device may be encoded with multiple different spatiotemporal resolutions. More specifically, each such video image may comprise a target view portion of relatively high spatiotemporal resolutions and remaining non-target view portions of relatively low spatiotemporal resolutions, and thus have an amount of image data that is relatively small to be transmitted from the upstream device to the client device in a relatively short time (e.g., within 10 milliseconds, within 20 milliseconds, within 50 milliseconds, etc.).

The sequence of (e.g., ordered, etc.) video images is rendered through a display device (not shown) operating in conjunction with the client device to the viewer (102) at a sequence of ordered time points denoted as "t1" through "t5". More specifically, a first video image "Frame 1" is received before a first time point "t1" and is rendered at the first time point "t1". A second video image "Frame 2" is received before a second time point "t2" and is rendered at the second time point "t2". A third video image "Frame 3" is received before a third time point "t3" and is rendered at the third time point "t3". A fourth video image "Frame 4" is received before a fourth time point "t4" and is rendered at the fourth time point "t4". A fifth video image "Frame 5" is received before a fifth time point "t5" and is rendered at the fifth time point "t5".

While the sequence of video images is rendered with the display device, viewing tracking data may be concurrently (e.g., continuously, discretely at each time point in a plurality of time points time-wise denser than the sequence of ordered time points, etc.) collected in real time or in near real time by the client device or a tracking device operating in conjunction with the client device. The viewing tracking data may be collected through inside-out tracking, outside-in tracking or a combination of the foregoing. Example inside-out tracking and outside-in tracking can be found in U.S. Provisional Patent Application No. 62/484,131, with an application title of "PASSIVE MULTI-WEARABLE-DEVICES TRACKING" by Ajit Ninan and Neil Mammen, filed on Apr. 11, 2017; U.S. Provisional Patent Application No. 62/556,915, filed on Sep. 11, 2017, with an application title of "MODULAR AND DETACHABLE WEARABLE DEVICES FOR AR/VR/MR," by Ajit Ninan and Neil Mammen, the entire contents of which are hereby incorporated by reference as if fully set forth herein.

For example, (e.g., immediately, etc.) before, (e.g., contemporaneously, etc.) while and/or (e.g., immediately, etc.) after the first video image "Frame 1" is to be, is being and/or was rendered on the display device to the viewer at the first time point "t1", a viewing tracking data portion of the viewing tracking data may be collected concurrently in real time or in near real time by the client device or the tracking device operating in conjunction with the client device. Such viewing tracking data portion indicates, or can be used (e.g., by the client device, by the upstream device, etc.) to determine or predict where the viewer's view position is at the first time point "t1" and where the viewer's view direction (or eye gaze direction) is directed at the first time point "t1", for example in reference to a depicted scene (e.g., a depicted 3D scene, etc.) of the first video image.

Based on the viewer's view position and direction as indicated in or otherwise determined from the viewing tracking data, the viewer's foveal view 104-1 at the first time point "t1" can be determined or spatially delineated by the client device. As the client device is likely to be collocated with the viewer, the client device can determine or predict relatively quickly (e.g., within a strict time budget of one millisecond, within a strict time budget of less than one millisecond, etc.) the viewer's view direction and position, as well as the viewer's foveal view (104-1). In other words, the viewer's foveal view at the first time point "t1", which may be different from the most recently determined foveal view used by the upstream device to generate the first video image "Frame 1," can be predicted or identified by the client device with no or little delay. Thus, the viewer's foveal view at the first time point "t1", which the client device predicts or identifies with no or little delay, represents a contemporaneous foveal view with which the viewer is going to be viewing the first video image "Frame 1."

Based on the viewer's foveal view (104-1) at the first time point "t1", the client device extracts/generates a foveal-view region from a target view portion of the first video image "Frame 1" for rendering at the first time point "t1" to cover (e.g., completely, with a safety margin, etc.) the viewer's foveal view at the first time point "t1" as determined/predicted from the viewing tracking data.

In some embodiments, the target view portion with the relatively high spatiotemporal resolution is limited in (spatial) size to reduce the volume of transmitted data from the upstream device to the client device, and does not cover the viewer's entire vision field or the entire viewport of the display device.

As the target view portion of the first video image "Frame 1" is received with the relatively high spatiotemporal resolution, the foveal-view region extracted from the target view portion of the first video image "Frame 1" can be rendered by the client device with up to the same relatively high spatiotemporal resolution of the target view portion (e.g., with little or no upsampling, etc.) as received from the upstream device.

In addition, based on the viewer's foveal view (104-1) at the first time point "t1", the client device extracts/generates one or more non-foveal-view regions from the target view portion as well as remaining non-target view portions of the first video image "Frame 1" for rendering at the first time point "t1" to cover (e.g., completely, with a safety margin, etc.) the viewer's vision field or a (e.g., complete, substantially all, etc.) viewport of the display device outside the foveal-view region (which covers the viewer's foveal view) at the first time point "t1".

As the non-target view portions of the first video image "Frame 1" are received with relatively low spatiotemporal resolutions, some or all of the non-foveal-view regions extracted from the target view portion of the first video image "Frame 1" may be rendered by the client device with up to the relatively low spatiotemporal resolution of the target view portion as received from the upstream device. In some embodiments, spatial filtering may be applied to image data in the non-foveal-view regions to reduce spatial resolutions in these regions as received from the upstream device to one or more specific spatial resolutions simulating spatial resolutions of real-world scenes in the viewer's vision field.

Additionally, optionally or alternatively, based on the viewer's view position and view direction at the first time point "t1", the client device adjust/interpolate the extracted foveal-view and non-foveal-view regions from the target and non-target view portions of the first video image "Frame 1" to the viewer's (e.g., present, etc.) viewpoint as represented by the viewer's view position and view direction at the first time point "t1", before rendering the first video image "Frame 1." The first video image "Frame 1" with the adjusted/interpolated foveal-view and non-foveal-view regions to the present viewpoint is rendered in place of the pre-adjusted/pre-interpolated first video image "Frame 1" as decoded.

The viewing tracking data, and/or the viewer's view position and direction determined/measured for the first time point "t1", and/or the viewer's foveal view determined for the first time point "t1", may be provided by the client device to the upstream device in real time or in near real time.

Due to latency (or time delay) in network communications and data processing, the viewing tracking data and/or other viewing related data (e.g., view position and/or view direction derived from the viewing tracking data, etc.) may be received by the upstream device in a relatively long delay (e.g., longer than one millisecond, longer than five milliseconds, etc.) than the time interval (e.g., within one millisecond, within five milliseconds, etc.) which the client device takes to determine the viewer's view position and direction and/or the viewer's foveal view.

With the relatively long (e.g., roundtrip, etc.) delay affecting the upstream device and the client device, by the time a subsequent video image is generated based on the viewer's view position and view direction for the first time point "t1" and sent by the upstream device to the client device and then rendered by the client device at a subsequent time point such as the second time point "t2", the viewer is likely to have already moved to a new different view position and/or a new different view direction.

The upstream device may determine the viewer's most recent view position/direction, and/or the viewer's most recent foveal view based on the most recently received—but which likely would be outdated by the roundtrip delay—viewing tracking data or viewing related data, and further use such (delay-affected) viewer's most recent view position/direction, and/or the viewer's most recent foveal view to generate the subsequent video image such as the second video image "Frame 2."

By way of illustration but not limitation, the upstream device receives the most recently received viewing tracking data portion after the first video image "Frame 1" is rendered and before the second video image "Frame 2" is rendered, and determines, based on the most recently received viewing tracking data portion, the viewer's view position/direction and/or the viewer's foveal view (104-1) for the first time point "t1" as the viewer's most recent view position/direction, and/or the viewer's most recent foveal view.

It should be noted that, in various embodiments, the subsequent video image that is generated based on the most recently determined view position/direction while the viewer is viewing the preceding video image may or may not be the next video image immediately following the preceding video image in the sequence of ordered video images rendered by the client device to the viewer.

For the purpose of illustration only, in the present example, the preceding video image is the first video image "Frame 1," whereas the subsequent video image is the second video image "Frame 2" sent after the upstream device determines the viewer's most recent view position/direction, and/or the viewer's most recent foveal view.

To generate the second video image "Frame 2," the upstream device determines a target view portion for the second video image "Frame 2." The target view portion for the second video image "Frame 2" may or may not be the same as the target view portion for the first video image "Frame 1," depending on the movements of the viewer's eye gaze. The target view portion for the second video image "Frame 2" can be determined by the client device based at least in part on the viewer's foveal view as determined for the first time point "t1". By way of comparison, the target view portion for the first video image "Frame 1" was determined based at least in part on the viewer's foveal view as determined for a preceding time point (preceding the first time point "t1") at which a video image preceding the first video image "Frame 1" was rendered.

In some embodiments, the target view portion for the second video image "Frame 2" covers not only some or all of the viewer's foveal view at the first time point "t1", but also a surround region contiguous and/or surrounding the viewer's foveal view.

The spatial extent of the surround region in the second video image "Frame 2" may be determined based at least in part on a transmission latency time between the upstream device and the client device. The transmission latency time may be a round-trip delay time, including but not limited to some or all of a time interval from a time point at which the client device collected the viewing tracking data most recently received by the upstream device and a time point at which the client device receives the second image frame "Frame 2." The transmission time delay may be deduced wholly or in part from past network communication and data processing statistics collected by and exchanged between the client device and the upstream device. The transmission time delay may be deduced as an average or smoothened transmission time delay using a moving window of (e.g., most recently transmitted, etc.) video images (e.g., in a jitter buffer, etc.) transmitted from the upstream device to the client device.

The spatial extent of the surround region in the second video image "Frame 2" may be determined based at least in part on a variation in transmission latency time between the upstream device and the client device. For example, when a variation in transmission latency time occurs, the surround region may be enlarged with a larger or a smaller spatial margin that depends on the variation in transmission latency time.

When the transmission latency time or the variation thereof is largely or entirely used to determine or spatially delineate the surround region, the surround region may be determined or spatially delineated as a spatial region—in the second video image "Frame 2"—that is uniformly centered about the foveal-view region that is used to cover the viewer's foveal view at the first time point "t1".

The spatial extent of the surround region in the second video image "Frame 2" may be determined based at least in part on a predicted eye gaze displacement for the second time point "t2". The predicted eye gaze displacement for the second time point "t2" may be determined based on the viewer's position at the first time point "t1", the viewer's eye gaze velocity at the first time point "t1", the viewer's eye gaze acceleration at the first time point "t1", etc., as determined by the upstream device from the most recently received viewing tracking data portion collected as a part of the viewing tracking data.

When the transmission latency time or the variation thereof is largely or entirely used to determine or spatially delineate the surround region, the surround region may be determined or spatially delineated as a spatial region—in the second video image "Frame 2"—that is of an elongated shape emphasizing a direction of the predicted eye gaze displacement, and or covering surrounding areas of an estimated spatial trajectory corresponding to the predicted eye gaze displacement.

Additionally, optionally or alternatively, the spatial extent of the surround region in the second video image "Frame 2" may be determined based at least in part on a combination of one or more of: a transmission latency time, a variation in transmission latency time, a predicted eye gaze displacement, etc.

In addition to determining the target view portion for the second video image "Frame 2," the upstream device may further determine one or more non-target view portions for the second video image "Frame 2." The target view portion of the second video image "Frame 2" may be non-overlapping (but contiguous or adjoining) with the remaining non-target view portions of the second video image "Frame 2."

The target view portion or any of the remaining non-target view portions may be of a spatial shape in a variety of regular or irregular spatial shapes. Additionally, optionally or alternatively, the target view portion may have one or more of: a different spatial shape, a different size, a different aspect ratio, etc., from the remaining non-target view portions.

Additionally, optionally or alternatively, the target view portion and/or some or all of the remaining non-target view portions can be identified (e.g., as regions of interest, etc.) in image metadata encoded with the second video image "Frame 2" in a video stream used by the upstream device to stream the sequence of video images to the client device. The client device can use the image metadata to identify the target view portion from the remaining non-target view portions in the second video image "Frame 2."

The target view portion in the second video image "Frame 2" can be encoded into the video stream with a target spatiotemporal resolution higher than a non-target spatiotemporal resolution used to encode remaining non-target view portions in the second video image "Frame 2" that are outside the target view portion. The target view portion (of the second video image) encoded with the target spatiotemporal resolution and the remaining non-target view portions (of the second video image) encoded with the non-target spatiotemporal resolution can be transmitted via the video stream from the upstream to the client device.

In some embodiments, target view portions of the video images such as the target view portion of the second video image "Frame 2" are encoded in one or more first video sub-streams of the video stream, whereas remaining non-target view portions of the video images such as the remaining non-target view portions of the second video image "Frame 2" are encoded in one or more second different video sub-streams of the video stream.

The second video image "Frame 2" sent by the upstream device with the target view portion of the relatively high spatiotemporal resolution and the remaining non-target view portions of the lower spatiotemporal resolutions is received via the video stream and decoded by the client device, with a time delay from the first time point "t1" involving transmission delays and data processing delays, after the first time point "t1". For the purpose of illustration, the second video image "Frame 2" is decoded by the client device before the second time point "t2".

As in the case of rendering the first video image "Frame 1" before, (e.g., contemporaneously, etc.) while and/or (e.g., immediately, etc.) after the second video image "Frame 2" is to be, is being and/or was rendered on the display device to the viewer at the second time point "t2", a viewing tracking data portion of the viewing tracking data may be collected concurrently in real time or in near real time by the client device or the tracking device operating in conjunction with the client device. Such viewing tracking data portion indicates, or can be used (e.g., by the client device, by the upstream device, etc.) to determine or predict where the viewer's view position is at the second time point "t2" and where the viewer's view direction (or eye gaze direction) is directed at the second time point "t2", for example in reference to a depicted scene (e.g., a depicted 3D scene, etc.) in the second video image "Frame 2."

Based on the viewer's view position and view direction as indicated in or otherwise determined from the viewing tracking data, the viewer's foveal view 104-2 at the second time point "t2" can be determined or spatially delineated by the client device. As the client device is likely to be collocated with the viewer, the client device can determine or predict relatively quickly (e.g., within a strict time budget of one millisecond, within a strict time budget of less than one millisecond, etc.) the viewer's view direction and position, as well as the viewer's foveal view (104-2).

Based on the viewer's foveal view (104-2) at the second time point "t2", the client device extracts/generates a foveal-view region from a target view portion of the second video image "Frame 2" for rendering at the second time point "t2" to cover (e.g., completely, with a safety margin, etc.) the viewer's foveal view at the second time point "t2" as determined/predicted from the viewing tracking data. The client device may decode image metadata from the video stream. The image metadata may include a portion relating to the second video image, which identifies the target view portion from the remaining non-target view portions in the second video image.

As the target view portion of the second video image "Frame 2" is received with a relatively high spatiotemporal resolution, the foveal-view region extracted from the target view portion of the second video image "Frame 2" can be rendered by the client device with up to the same relatively high spatiotemporal resolution of the target view portion as received from the upstream device.

In addition, based on the viewer's foveal view (104-2) at the second time point "t2", the client device extracts/generates one or more non-foveal-view regions from the target view portion as well as remaining non-target view portions of the second video image "Frame 2" for rendering at the second time point "t2" to cover (e.g., completely, with a safety margin, etc.) the viewer's vision field or a (e.g., complete, substantially all, etc.) viewport of the display device outside the foveal-view region (which covers the viewer's foveal view) at the second time point "t2".

In some embodiments, the target view portion with the relatively high spatiotemporal resolution is limited in (spatial) size and does not cover the viewer's entire vision field or the entire viewport of the display device. As the non-target view portions of the second video image "Frame 2" are received with relatively low spatiotemporal resolutions, some or all of the non-foveal-view regions extracted from the target view portion of the second video image "Frame 2" may be rendered by the client device with up to the relatively low spatiotemporal resolution of the target view portion as received from the upstream device. In some embodiments, spatial filtering may be applied to image data in the non-foveal-view regions to reduce spatial resolutions in these regions as received from the upstream device to one or more specific spatial resolutions comparable to, or simulating, spatial resolutions of real-world scenes in the viewer's vision field.

Additionally, optionally or alternatively, based on the viewer's view position and view direction at the second time point "t2", the client device adjust/interpolate the extracted foveal-view and non-foveal-view regions from the target and non-target view portions of the second video image "Frame 2" to the viewer's (e.g., present, etc.) viewpoint as represented by the viewer's view position and view direction at the second time point "t2", before rendering the second video image "Frame 2." The second video image "Frame 2" with the adjusted/interpolated foveal-view and non-foveal-view regions to the present viewpoint is rendered in place of the pre-adjusted/pre-interpolated second video image "Frame 2" as decoded.

The viewing tracking data, and/or the viewer's view position and direction determined/measured for the second time point "t2", and/or the viewer's foveal view determined for the first time point "t2", may be provided by the client device to the upstream device in real time or in near real time. The viewing tracking data and viewing related data can be used by the upstream device to retrieve subsequent source image(s) from the image data store, to generate subsequent video image(s) such as "Frame 3," "Frame 4," "Frame 5," and so forth, from the source image(s), to transmit the subsequent video image (2) to the client device, etc. Additionally, optionally or alternatively, viewport information the specifies or informs the viewport of the display device may be sent by the client device to the upstream device. The viewport information can be used by the upstream server as a basis to determine a video image size to cover the viewport of the display device.

At least a part of the target view portion in the second video image "Frame 2" can be rendered by the client device, at the second time point "t2", on the display device to the viewer. The part of the target view portion rendered on the display device includes a foveal-view region that corresponds to a foveal view in a vision field of the viewer at the second time point "t2".

4. Surround Regions

FIG. 2A illustrates an example video image 200-1 (e.g., the second video image "Frame 2" of FIG. 1, etc.) that is encoded by an upstream device with differential spatiotemporal resolutions. The video image (200-1) comprises a target view portion 202-1 of a relatively high spatiotemporal resolution and remaining non-target view portions 204-1 of one or more lower spatiotemporal resolutions.

The spatial location (e.g., a centroid position, a central direction, etc.) of a target view portion such as 202-1 may be determined by the most recently received view position and view direction of a viewer as determined from viewing tracking data collected while (or immediately before or after) a preceding video image (e.g., the first video image "Frame 1," etc.) to the video image (200-1) was being rendered and viewed by the viewer.

The target view portion (202-1) is chosen to cover not only a foveal view (e.g., 104-1, etc.) corresponding to the most recently received view position and view direction of the viewer, but also a surround region 212-1 that covers substantially all possible foveal views (e.g., 104-2, etc.) when the video image (200-1) is rendered, as estimated from a range of factors such as time delays, eye gaze movements, regions of interests in the video image (200-1), etc.

The (e.g., entire, etc.) spatial extent of a target view portion such as 202-1 may be determined or delineated based on one or more of: direction-independent target view determination factors, direction-dependent target view determination factors, etc. Example direction-independent target view determination factors may include, but are not necessarily limited to only, any of: transmission delays, data processing delays, safety margins, sensory data acquisition time, sensory data analysis time, etc. Example direction-dependent target view determination factors may include, but are not necessarily limited to only, any of: eye gaze velocities (or rates of changes in the viewer's view position and/or view direction), eye gaze accelerations, regions of interest in the video image, etc. As illustrated in FIG. 2A, the spatial extent of the target view portion (202-1) may be determined by one or more direction-independent target view determination factors such as one or more of: transmission delays, data processing delays, safety margins, sensory data acquisition time, sensory data analysis time, etc. The viewing tracking data as relating to the viewer's viewing of the previous video image (the first video image "Frame 1" in the present example) may indicate that the viewer's eye gaze is stationary while the previous video image was being rendered and viewed by the viewer.

FIG. 2B illustrates an example video image 200-2 (e.g., the third video image "Frame 3" of FIG. 1, etc.) that is encoded by an upstream device with differential spatiotemporal resolutions. The video image (200-2) comprises a target view portion 202-2 of a relatively high spatiotemporal resolution and remaining non-target view portions 204-2 of one or more lower spatiotemporal resolutions.

The spatial location (e.g., a centroid position, a central direction, etc.) of a target view portion such as 202-2 may be determined by the most recently received view position and view direction of a viewer as determined from viewing tracking data collected while (or immediately before or after) a preceding video image (e.g., the second video image "Frame 2," etc.) to the video image (200-2) was being rendered and viewed by the viewer.

The target view portion (202-2) is chosen to cover not only a foveal view (e.g., 104-2, etc.) corresponding to the most recently received view position and view direction of the viewer, but also a surround region 212-2 that covers substantially all possible foveal views (e.g., 104-3, etc.) when the video image (200-2) is rendered, as estimated from a range of factors such as time delays, eye gaze movements, regions of interests in the video image (200-2), etc.

As illustrated in FIG. 2B, the spatial extent of the target view portion (202-2) may be determined at least in part by one or more direction-dependent target r determination factors such as one or more of: eye gaze velocities, eye gaze accelerations, regions of interest, etc. The viewing tracking data as relating to the viewer's viewing of the previous video image (the second video image "Frame 2" in the present example) may indicate that the viewer's eye gaze is moving with a non-zero velocity and/or a non-zero acceleration while the previous video image was being rendered and viewed by the viewer.

Figure 2C:
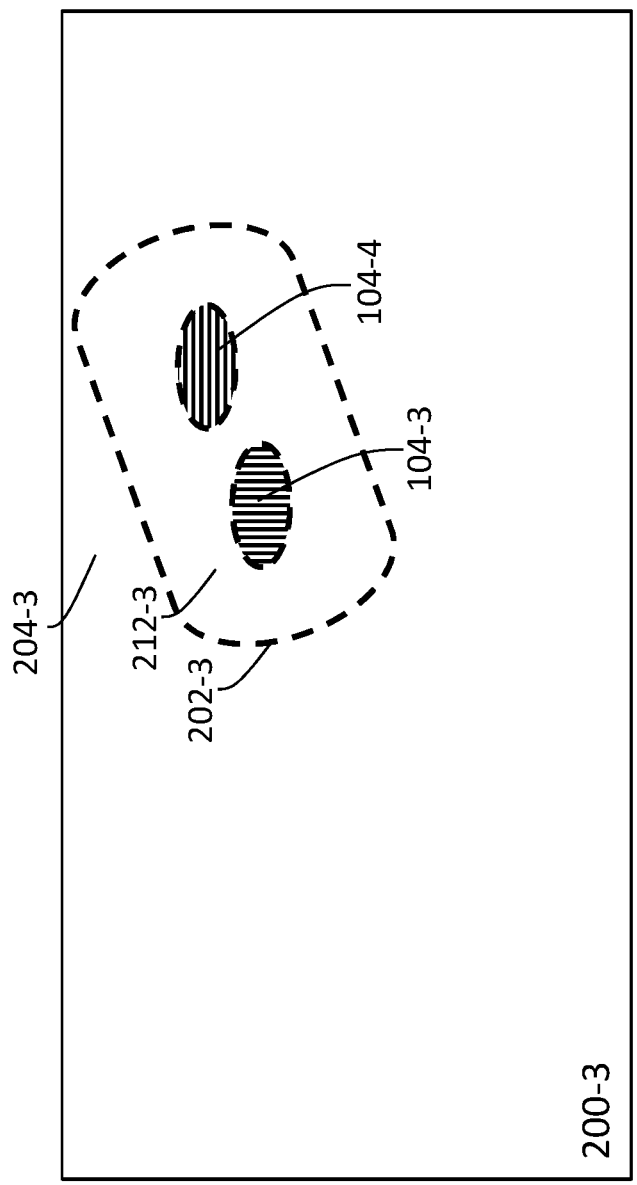

FIG. 2C illustrates an example video image 200-3 (e.g., the fourth video image "Frame 4" of FIG. 1, etc.) that is encoded by an upstream device with differential spatiotemporal resolutions. The video image (200-3) comprises a target view portion 202-3 of a relatively high spatiotemporal resolution and remaining non-target view portions 204-3 of one or more lower spatiotemporal resolutions.

The spatial location (e.g., a centroid position, a central direction, etc.) of a target view portion such as 202-3 may be determined by the most recently received view position and view direction of a viewer as determined from viewing tracking data collected while (or immediately before or after) a preceding video image (e.g., the third video image "Frame 3," etc.) to the video image (200-3) was being rendered and viewed by the viewer.

The target view portion (202-3) is chosen to cover not only a foveal view (e.g., 104-3, etc.) corresponding to the most recently received view position and view direction of the viewer, but also a surround region 212-3 that covers substantially all possible foveal views (e.g., 104-4, etc.) when the video image (200-3) is rendered, as estimated from a range of factors such as time delays, eye gaze movements, regions of interests in the video image (200-3), etc.

As illustrated in FIG. 2C, the spatial extent of the target view portion (202-3) may be determined at least in part by one or more direction-independent and/or direction-dependent target view determination factors such as one or more of: transmission delays, data processing delays, safety margins, sensory data acquisition time, sensory data analysis time, eye gaze velocities, eye gaze accelerations, regions of interest, etc. The viewing tracking data as relating to the viewer's viewing of the previous image may indicate that the viewer's eye gaze is moving with a non-zero velocity and/or a non-zero acceleration while the previous video image was being rendered and viewed by the viewer. Like the target view portion (202-2) of FIG. 2B, the target view portion (202-3) of FIG. 2C is an elongated region (along the longitudinal direction) with a directionality obtained based on direction-dependent factors such as region of interest, eye gaze velocity/acceleration as determined from the viewing tracking data relating to the previous video image (the third video image "Frame 3" in the present example) collected while the previous video image is rendered and viewed by the viewer, etc. However, because of direction-independent factors such as increasing time delays, as compared with the target view portion (202-2) of FIG. 2B, the target view portion (202-3) of FIG. 2C has a larger width in the transverse direction of the elongated shape.

5. Vision Field

Figure 2D:
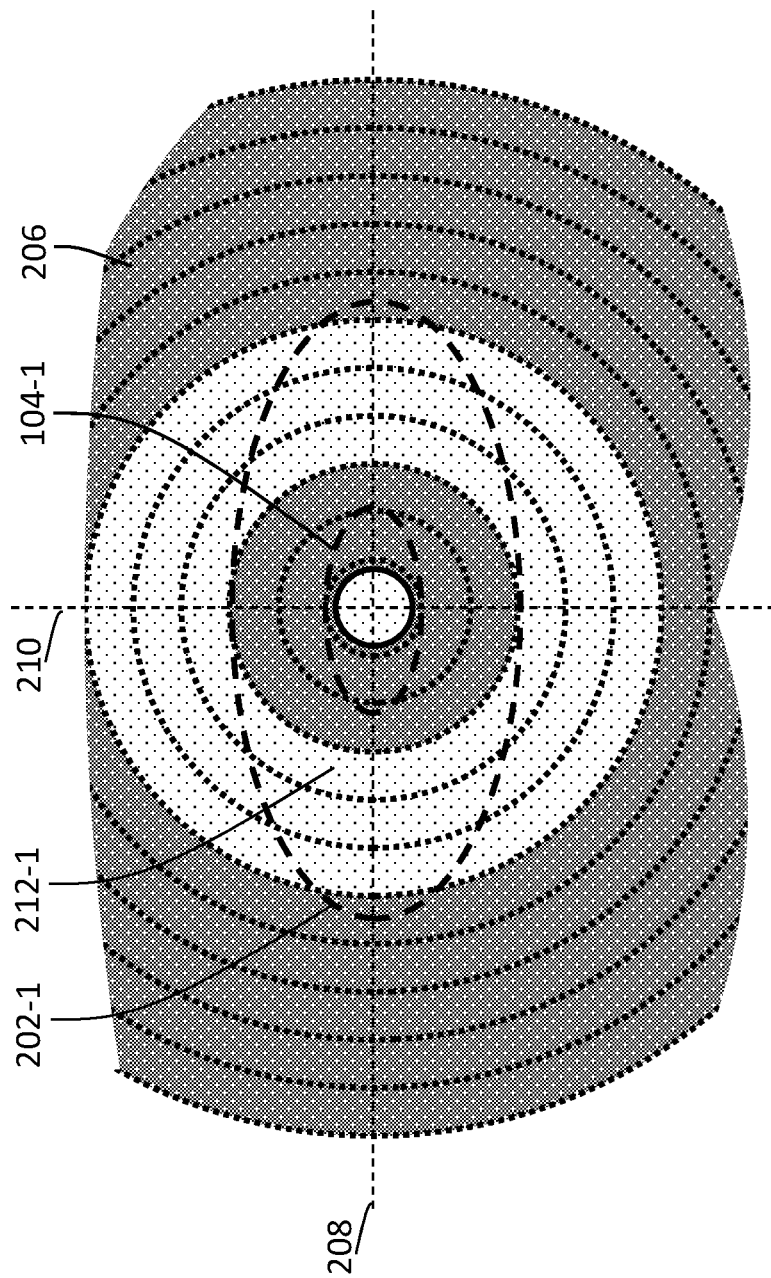
FIG. 2D illustrates an example vision field of a viewer.

FIG. 2D illustrates an example vision field 206 of a viewer (e.g., 102 of FIG. 1, etc.) (e.g., for one of the viewer's eyes, etc.). The viewer's eye gaze direction is represented by the intersection of a horizontal axis 208 (e.g., along the interpupil distance) and a vertical axis (210) in the vision field (206). Each of the concentric circular lines indicates a certain angle in the viewer's vision field in reference to the viewer's eye gaze direction.

In some embodiments, a video image (e.g., the second video image "Frame 2" of FIG. 1, the video image 200-1 of FIG. 2A, etc.) as described herein may be rendered in a viewport of a display device operating in conjunction with a client device worn or used by the viewer (102) to cover some or all of the viewer's vision field (206).

As illustrated in FIG. 2D, a target view portion (e.g., 202-1 of FIG. 2A, etc.) of the video image (200-1 of FIG. 2A) comprises a foveal view (e.g., 104-1 of FIG. 2A, etc.) that covers (e.g., entirely, substantially, etc.) the viewer's foveal vision up to some or all of the viewer's near-peripheral vision (and possibly even a safety region) in the viewer's vision field. In some embodiments, no or little upsampling operation is performed on the foveal view (104-1) of the target view portion (202-1) as received by the client device via a video stream.

The target view portion (202-1) of the video image (200-1 of FIG. 2A) further comprises a surround region (e.g., 212-1 of FIG. 2A, etc.) that covers a non-foveal view region adjacent and/or contiguous to the foveal view (104-1) of the viewer's vision field (206).

Additionally, optionally or alternatively, the video image (200-1 of FIG. 2A) may further comprise one or more remaining non-target view portions outside the target view portion (202-1). In some embodiments, image data in the remaining non-target view portions may be coded with relatively low spatiotemporal resolutions, as compared with image data in the target view portion (202-1). Additionally, optionally or alternatively, image data in the remaining non-target view portions may be coded with less color information (or less chrominance data), as compared with image data in the target view portion (202-1).

Target view portions and non-target view portions with different image properties (e.g., spatial resolutions, frame rates, dynamic ranges, color gamuts, etc.) as described herein may be kept in separate memory buffers (e.g., in the upstream device, in the client device, etc.). In some embodiments, some or all of these memory buffers may be updated with the same frame rate (or buffer refresh rate). In other embodiments, at least one of the memory buffers may be updated at a different frame rate (or buffer refresh rate) from frame rate(s) (or buffer refresh rate(s)) used to update the others of the memory buffers.

6. 3D and Multiview Images

A video image as described herein may or may not represent a two-dimensional array of pixels. In various embodiments, a video image as described herein may refer to any of: an omnidirectional image, a non-omnidirectional, a stereoscopic image, a panoramic image, a non-panoramic image, a multiview image, a sampled view in a multiview image, a sampled view with multiple image layers in a multiview image, a texture image, a light-field rendered image, etc. Accordingly, a view portion, such as a target view portion or a non-target view portion as described herein, may or may not represent a subset of pixels in a 2D video image. In various embodiments, a view portion, such as a target view portion or a non-target view portion as described herein, may refer to an image portion in any of: an omnidirectional image, a non-omnidirectional, a stereoscopic image, a panoramic image, a non-panoramic image, a multiview image, a sampled view in a multiview image, a sampled view with multiple image layers in a multiview image, a texture image, a light-field rendered image, etc.

For example, in some embodiments, a video image as described herein may refer to a multiview image that comprises a plurality of sampled views as viewed from a plurality of viewpoints in a viewing volume in which a viewer can change view positions and viewing angles to a 3D scene depicted by the multiview image.

In some embodiments, each sampled view in the plurality of sampled views may comprise a panoramic texture image and a corresponding panoramic depth image, as viewed from a respective viewpoint in the plurality of viewpoints in the viewing volume.

Figure 2E:
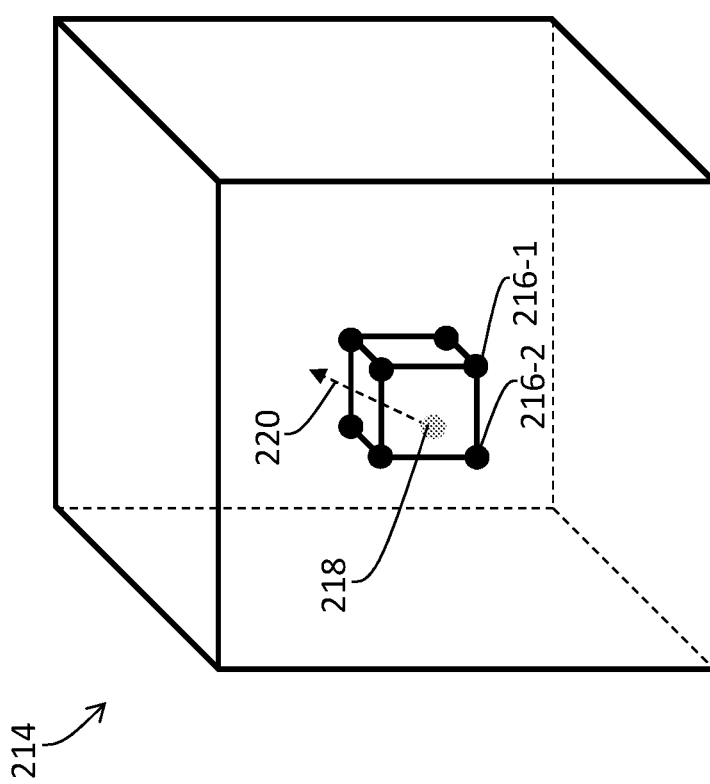
FIG. 2E illustrates an example viewing volume from which sampled views of a multiview image are originated.

FIG. 2E illustrates an example viewing volume 214 from which a plurality of sampled views of a multiview image (e.g., the second video image "Frame 2" of FIG. 1, the video image 200-1 of FIG. 2A, etc.) is originated. The plurality of sampled views of the multiview image comprises a plurality of sampled panoramic texture images and a plurality of sampled panoramic depth maps, as seen from a plurality of viewpoints distributed throughout the viewing volume (214).

In some embodiments, based on the most recently received viewing tracking data received by an upstream device (e.g., a video encoder that selects and transmits video images encoded from multiview images in the video stream, etc.) from a client device (e.g., a video decoder that receives and decodes video images encoded from the video stream, etc.) of the viewer, the viewer may be directing the viewer's vision field (e.g., as illustrated in FIG. 2D, etc.) toward a target view that is oriented in a target view direction 220 and is originated from a target view position 218, inside the viewing volume (214). A set of neighboring sampled views (e.g., 216-1, 216-2, etc.) in the multiview image may be identified based on one or both of the target view position (218) and/or the target view direction (220), and may represent a proper subset of sampled views in a plurality of sampled views in the multiview image.

In the present example, since each sampled view in the neighboring sampled views (e.g., 216-1, 216-2, etc.) comprises a sampled panoramic image and a sampled panoramic depth map, it is sufficient to access these neighboring sampled views to access image and depth data for a target view's direction that is covered by wide fields of views in these neighboring sampled views, for example regardless of what the target view's direction is. As a result, synthesizing a texture image to cover the viewport of the display device (which may cover some or all of the viewer's vision field) for the target view can be based on the relatively small total number of sampled views in the set of neighboring sampled views, independent of the target view's position as well as independent of non-neighboring sampling views in the rest of the viewing volume (214).

Under techniques as described herein, the sampled panoramic texture image and the sampled panoramic depth map of each sampled view in the set of neighboring sampled views may be encoded with differential spatiotemporal resolutions in a video stream from the upstream device to the viewer's client device.

For example, in a sampled panoramic texture image or depth map of the video image (or the multiview image), a target image (or target depth map) portion may be determined or spatially delineated based on the target view position (218) and the target view direction (220). The target image (or target depth map) portion may be selected to cover not only the viewer's foveal view in the viewer's vision but also a surround region that covers (e.g., all, etc.) possible foveal views when a target view image constructed (directly or indirectly) from the set of neighboring sampled views of the video image (or the multiview image) is being rendered to the viewer.

Image/depth data in the target image (or target depth map) portion in the sampled panoramic texture image or depth map of the video image (or the multiview image) may be encoded in the video stream with a relatively high spatiotemporal resolution. Image/depth data in remaining non-target image (or remaining non-target depth map) portions in the sampled panoramic texture image or depth map of the video image (or the multiview image) may be encoded in the video stream with relatively low spatiotemporal resolutions.

In some embodiments, each sampled view in the plurality of sampled views may comprise a plurality of texture images and a plurality of depth maps, as viewed from a plurality of view directions originated from a plurality of viewpoints in a viewing volume (e.g., 214, etc.).

In some embodiments, based on the most recently received viewing tracking data received by an upstream device (e.g., a video encoder that selects and transmits video images encoded from multiview images in the video stream, etc.) from a client device (e.g., a video decoder that receives and decodes video images encoded from the video stream, etc.) of the viewer, the viewer may be directing the viewer's vision field (e.g., as illustrated in FIG. 2D, etc.) toward a target view that is oriented from a target view direction (e.g., 220, etc.) and a target view position (e.g., 218, etc.), inside the viewing volume (214). A set of neighboring sampled views (e.g., 216-1, 216-2, etc.) in the multiview image may be identified based on one or both of the target view position (218) and/or the target view direction (220), and may represent a proper subset of sampled views in a plurality of sampled views in the multiview image.

In the present example, since each sampled view in the neighboring sampled views (e.g., 216-1, 216-2, etc.) comprises a plurality of texture images and a plurality of depth maps, it is sufficient to access these neighboring sampled views to access image and depth data for a target view's direction that is covered by wide fields of views in these neighboring sampled views. As a result, synthesizing a texture image to cover the viewport of the display device (which may cover some or all of the viewer's vision field) for the target view can be based on the relatively small total number of sampled views in the set of neighboring sampled views, independent of the target view's position as well as independent of non-neighboring sampling views in the rest of the viewing volume (214).

Under techniques as described herein, a texture image and a depth map from a sampled view in the set of neighboring sampled views may be encoded with differential spatiotemporal resolutions in a video stream from the upstream device to the viewer's client device.

For example, in a texture image or depth map of the video image (or the multiview image), a target image (or target depth map) portion may be determined or spatially delineated based on the target view position (218) and the target view direction (220). The target image (or target depth map) portion may be selected to cover not only the viewer's foveal view in the viewer's vision but also a surround region that covers (e.g., all, etc.) possible foveal views when a target view image constructed (directly or indirectly) from the set of neighboring sampled views of the video image (or the multiview image) is being rendered to the viewer.

Image/depth data in the target image (or target depth map) portion in the texture image or depth map of the video image (or the multiview image) may be encoded in the video stream with a relatively high spatiotemporal resolution. Image/depth data in remaining non-target image (or remaining non-target depth map) regions in the texture image or depth map of the video image (or the multiview image) may be encoded in the video stream with relatively low spatiotemporal resolutions.

Example multiview images and target view images constructed from multiview images can be found in U.S. Provisional Patent Application No. 62/518,187, with an application title of "CODING MULTIVIEW VIDEO" by Haricharan Lakshman and Ajit Ninan, filed on Jun. 12, 2017; U.S. Provisional Patent Application No. 62/582,445, with an application title of "PARAMETERIZING 3D SCENES FOR VOLUMETRIC VIEWING" by Haricharan Lakshman and Ajit Ninan, filed on Nov. 7, 2017, the entire contents of which are hereby incorporated by reference as if fully set forth herein.

In some embodiments, one or more "INTER_VIEW" prediction methods are used for compressing the amount of data to be transmitted from an upstream device to a downstream client device. Key view images, whether or not included in the set of neighboring sampled views, may be encoded along with any dependent view images that are of sampled views included in the set of neighboring sampled views into the multiview video signal or bitstream. Additionally, optionally or alternatively, zero, one or more other prediction methods (e.g., "INTER" prediction methods, "INTRA" prediction methods, etc.) other than the "INTER_VIEW" prediction methods can be used for prediction (or compression) in encoding some or all of the key view images and the dependent view images that are to be sent to the downstream device. Example "INTER_VIEW", "INTER", and "INTRA" prediction methods in connection with multiview images can be found in U.S. Provisional Patent Application No. 62/518,187, with an application title of "CODING MULTIVIEW VIDEO" by Haricharan Lakshman and Ajit Ninan, filed on Jun. 12, 2017, the entire contents of which are hereby incorporated by reference as if fully set forth herein.

In some embodiments, the upstream device signals prediction methods used in encoding, operational parameters used in the prediction methods, (e.g., non-linear, etc.) mapping functions (e.g., optical transfer functions, electric transfer functions, perceptual quantization functions, HLG functions, gamma-based functions, tone mapping functions, inverse tone mapping functions, etc.) used in encoding, operational parameters (e.g., gamma value, min luminance, max luminance, mid-tone luminance, pivots, offsets, slopes, etc.) used in the mapping functions, etc., to the downstream device. For example, some or all of indexes or IDs identifying the prediction methods, indexes or IDs identifying the mapping functions, the operational parameters for these methods and/or functions, etc., may be encoded in-band (e.g., fill elements, header fields, etc., in image data payloads, etc.) or separately (e.g., as metadata fields, in a separate metadata sub-stream, etc.) from image data.

7. Streaming Server and Client

Figure 3A:
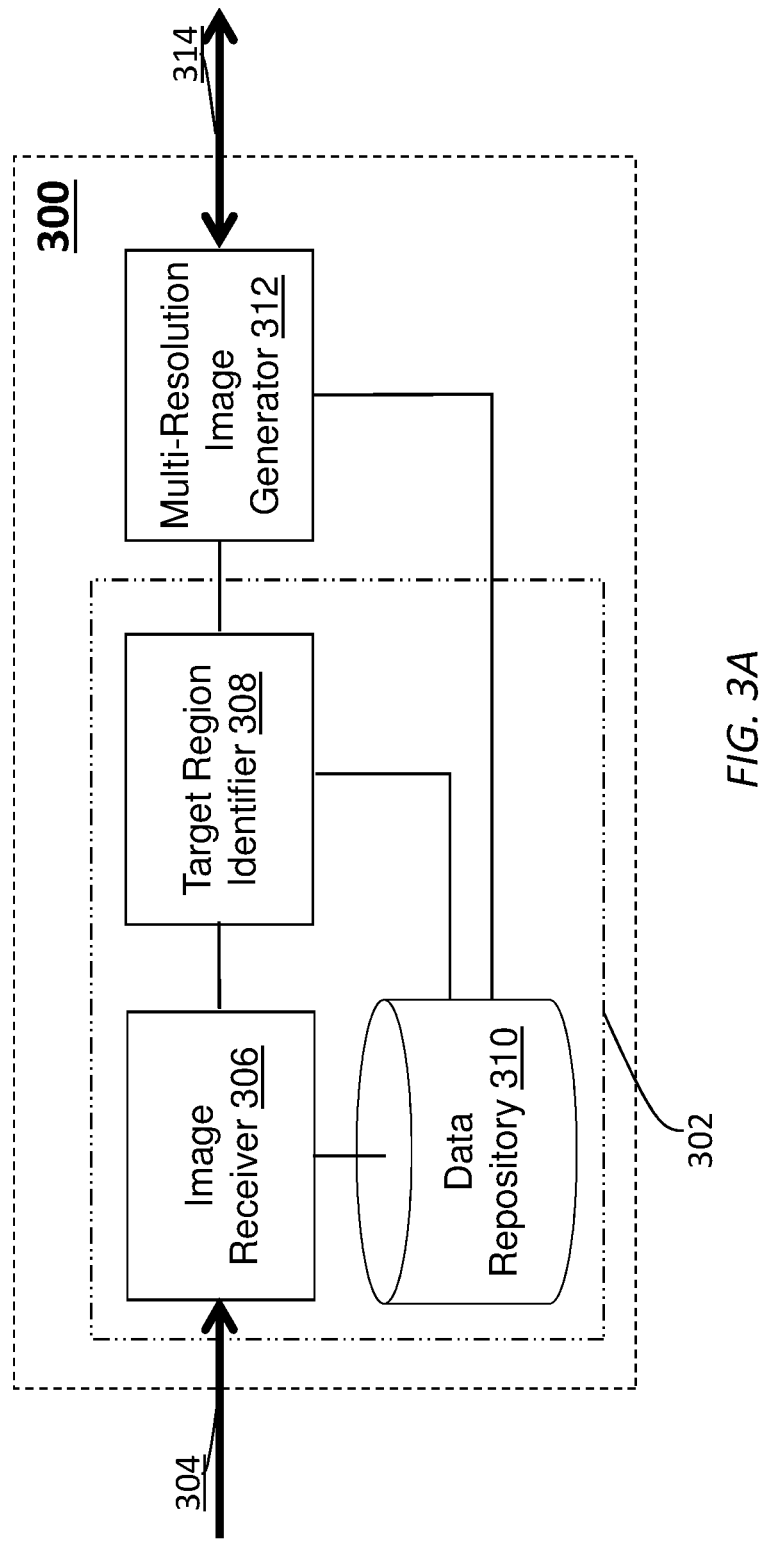
FIG. 3A through FIG. 3C illustrate example video streaming servers and clients.

FIG. 3A illustrates an example video streaming server 300 that comprises an image processor 302, a multi-resolution image generator 312, etc. In some embodiments, the image processor (302) comprises an image receiver 306, a target region identifier 308, a data repository 310, etc. Some or all of the components of the video streaming server (300) may be implemented by one or more devices, modules, units, etc., in software, hardware, a combination of software and hardware, etc.

In some embodiments, the image receiver (306) comprises software, hardware, a combination of software and hardware, etc., configured to receive an input image stream 304 from an image source such as an image data store, a cloud-based image source, a camera system in connection with a VR application, an AR application, a remote presence application, a display application, etc.; decode the input image stream (304) into one or more input video images (e.g., a sequence of input video images, etc.); etc.

In some embodiments, the target region identifier (308) comprises software, hardware, a combination of software and hardware, etc., configured to identify or spatially delineate target view portions (or target depth maps) in the input video images. The identification of the input video images into the target view portions and remaining non-target view portions may be, but are not limited to only, single-image-based, multi-image-based, Group-of-Picture (GOP)-based, scene-based, multiple-scene-based, etc.

In some embodiments, regions of interest in the video images may be identified or spatially delineated based on video metadata in image metadata received with and decoded from the input image stream (304).

Additionally, optionally, or alternatively, in some embodiments, the regions of interest in the video images may be identified or spatially delineated based on video metadata generated by the target region identifier (308).

In some embodiments, video metadata as described herein may be generated by the video streaming server (300) and/or an upstream system with user input from a video professional such as a director, a colorist, a video engineer, etc. In some embodiments, the upstream system may be an upstream video streaming server, which generates the input image stream (304) with a (e.g., uniform) high spatial resolution and/or delivers the input image stream (304) to the video streaming server (300) through one or more high bandwidth network connections.

In some embodiments, video metadata as described herein may be generated by the video streaming server (300) and/or the upstream system by performing image content analyses on the input image stream (304). Such image content analyses may be performed using one or more of: analysis rules, image analysis tools, any combination of one or more computer vision techniques such as Haar Filters, wavelet decomposition, Fourier space based spatial resolution tracking, etc.

In some embodiments, video metadata as described herein may be generated by the video streaming server (300) and/or the upstream system based on viewing tracking data collected by a client device of a viewer.

In some embodiments, the data repository (310) represents one or more databases, one or more data storage units/modules/devices, etc., configured to support operations such as storing, updating, retrieving, deleting, etc., with respect to some or all of the input video images, image metadata such as video metadata, etc.

In some embodiments, the multi-resolution image generator (308) comprises software, hardware, a combination of software and hardware, etc., configured to receive, via a bidirectional data flow 314, viewing angles, sizes, aspect ratios, etc., of a viewer's vision field (or fields of view) over time in relation to a spatial coordinate system in which video content is to be rendered in the viewer's vision field; generate an overall video stream comprising target and non-target view portions encoded with different spatial resolutions and/or different frame rates; provide/transmit the overall video stream via the bidirectional data flow 314 (directly or indirectly through intermediate devices, etc.) to a video streaming client, a display device, a storage device, etc.

Additionally, optionally, or alternatively, some or all of image processing operations such as image rotation determination, image alignment analysis, scene cut detections, transformation between coordinate systems, temporal dampening, display management, content mapping, color mapping, field-of-view management, etc., may be performed by the video streaming server (300).

The video streaming server (300) may be used to support real time vision applications, near-real-time vision applications, non-real-time vision applications, virtual reality, augmented reality, helmet mounted display applications, heads up display applications, games, 2D display applications, 3D display applications, multi-view display applications, etc. For example, some or all of video images, image metadata, viewport parameters (e.g., viewport center coordinates, aspect ratios, etc.), per-viewport image metadata, viewport image data, etc., are generated or accessed by the video streaming server (300) in real time, in near real time, etc.

Figure 3B:
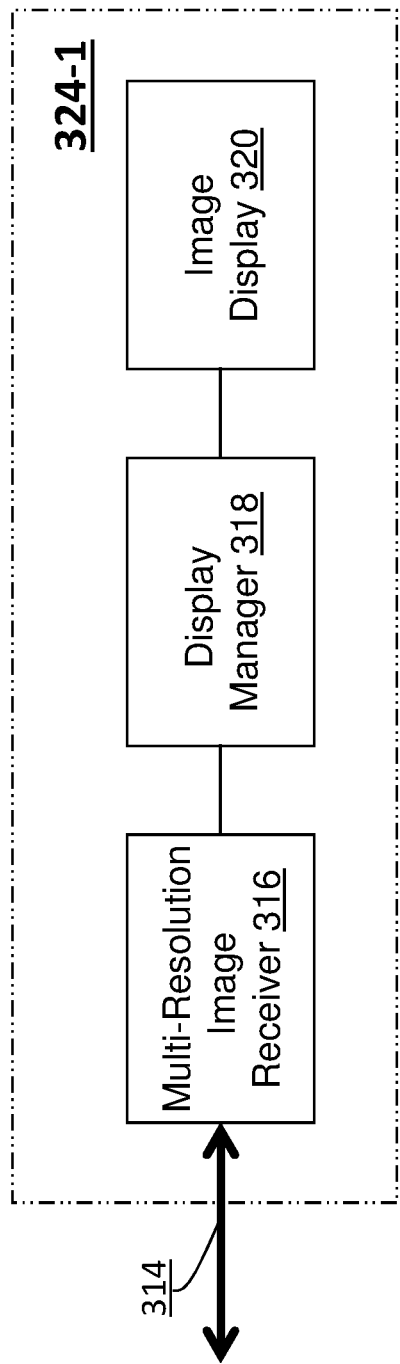

FIG. 3B illustrates an example image rendering system 324-1 that comprises a multi-resolution image receiver 316, a display manager 318, an image display 320, etc. Some or all of the components of the image rendering system (324-1) may be implemented by one or more devices, modules, units, etc., in software, hardware, a combination of software and hardware, etc.

In some embodiments, the multi-resolution image receiver (316) comprises software, hardware, a combination of software and hardware, etc., configured to send, via a bidirectional data flow 314, viewing angles, sizes, aspect ratios, etc., of a viewer's vision field (or field of view) over time in relation to a spatial coordinate system in which video content is to be rendered in the viewer's vision field; receive an overall video stream comprising target and non-target view portions encoded with different spatial resolutions and/or different frame rates; etc.

The viewer may move the viewer's view position and viewing angle at runtime. The image rendering system (324-1) is configured to generate or synthesize video content to be rendered with the viewer's display device. In some embodiments, video data from one or more video sub-streams in the received video stream may be stitched or composited together to form a unified imagery. De-blocking operations, de-contouring operations, blurring operations, etc., may be performed as a part of compositing the video content to be rendered with the viewer's display device.

In some embodiments, the display manager (318) comprises software, hardware, a combination of software and hardware, etc., configured to perform display management operations on the video content to be rendered on the image display (320), where the video content is decoded and composited from the video sub-streams in the overall video stream received by the image rendering system (324-1); output display managed video content to the image display (320) for zero-latency rendering; etc.

Additionally, optionally, or alternatively, some or all of image rendering operations such as face detection, head tracking, motion detection, position detection, rotation determination, transformation between coordinate systems, temporal dampening of time-varying image parameters, any other temporal manipulation of image parameters, display management, content mapping, tone mapping, color mapping, field-of-view management, prediction, navigations through mouse, trackball, keyboard, foot tracker, actual body motion, etc., may be performed by the image rendering system (324-1).

The image rendering system (324-1) may be used to support real time vision applications, near-real-time vision applications, non-real-time vision applications, virtual reality, augmented reality, helmet mounted display applications, heads up display applications, games, 2D display applications, 3D display applications, multi-view display applications, etc. For example, some or all of video images, image metadata, viewport parameters (e.g., viewport center coordinates, aspect ratios, etc.), per-viewport image metadata, viewport image data, etc., are generated or accessed by the image rendering system (324-1) in real time, in near real time, etc.

Techniques as described herein can be implemented in a variety of system architectures. Some or all image processing operations as described herein can be implemented by one or more of cloud-based video streaming servers, video streaming servers collocated with or incorporated into video streaming clients, image rendering systems, image rendering systems, display devices, etc. Based on one or more factors such as types of vision applications, bandwidth/bitrate budgets, computing capabilities, resources, loads, etc., of recipient devices, computing capabilities, resources, loads, etc., of video streaming servers and/or computer networks, etc., some image processing operations can be performed by a video streaming server, while some other image processing operations can be performed by a video streaming client, an image rendering system, a display device, etc.

Figure 3C:
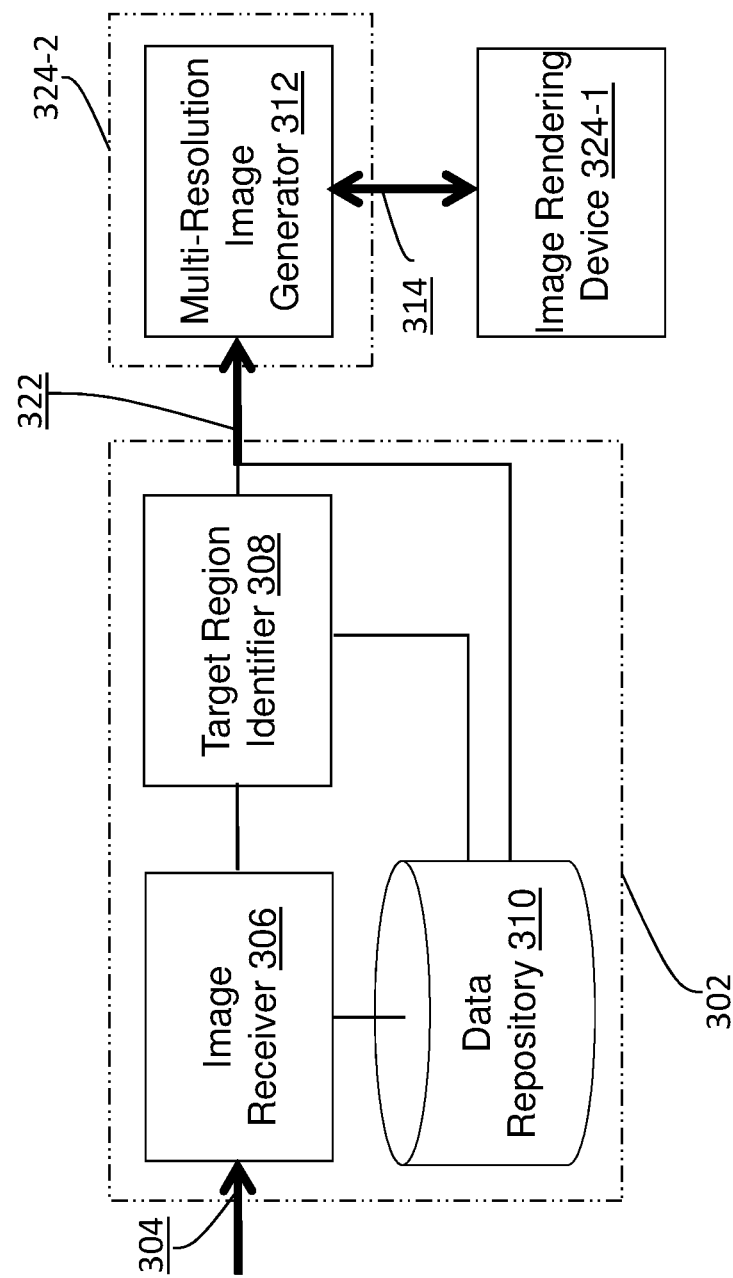

FIG. 3C illustrates an example configuration in which a multi-resolution image generator (e.g., 312, etc.) is incorporated into an edge video streaming server 324-2. In some embodiments, an image processor 302 of FIG. 3C may be cloud-based. In some embodiments, the image processor (302) may be located in a core network separate from edge devices such as the edge video streaming server (324-2). As in FIG. 3A, the image processor (302) may comprise an image receiver 306, a target region identifier 308, a data repository 310, etc. The image processor (302) may represent an upstream video streaming server that communicates with the edge video streaming server (324-2) over relatively high bitrates. Some or all of the components of the image processor (302) and/or the edge video streaming server (324-2) may be implemented by one or more devices, modules, units, etc., in software, hardware, a combination of software and hardware, etc.

In some embodiments, the image processor (302) is configured to output video images and video metadata in a data flow 322 to downstream devices one of which may be the edge video streaming server (324-2).

In some embodiments, the edge video streaming server (324-2), or the multi-resolution image generator (312) therein, comprises software, hardware, a combination of software and hardware, etc., configured to determine viewing angles, sizes, aspect ratios, etc., of a viewer's vision field (or field of view) over time in relation to a spatial coordinate system in which video content is to be rendered in the viewer's vision field; generate an overall video stream comprising target and non-target view portions encoded with different spatial resolutions and/or different frame rates; provide/transmit the overall video stream via the bidirectional data flow 314 directly or indirectly through intermediate devices, etc.) to a video streaming client, a display device, a storage device, etc.

In some embodiments, an image rendering device (e.g., 324-1), or a display manager (e.g., 318 of FIG. 2B) therein, comprises software, hardware, a combination of software and hardware, etc., configured to perform display management operations on video content to be rendered on the image display (320), where the video content is decoded and composited from the overall video stream received by the image rendering system (324-1); output display managed video content to the image display (320) for zero-latency rendering; etc.

8. Example Process Flows

FIG. 4A illustrates an example process flow according to an example embodiment of the present invention. In some example embodiments, one or more computing devices or components may perform this process flow. In block 402, an upstream device such as a local or remote video streaming server, based on viewing tracking data received from a streaming client device after a first time, determines a target view direction of a viewer in relation to a three-dimensional (3D) scene depicted by a first video image (a) that has been streamed in a video stream to the streaming client device before the first time point and (b) that has been rendered with the streaming client device to the viewer at the first time point.

In block 404, the upstream device identifies, based on the target view direction of the viewer, a target view portion in a second video image to be streamed in the video stream to the streaming client device before a second time point subsequent to the first time point and to be rendered at the second time point.

In block 406, the upstream device encodes the target view portion in the second video image into the video stream with a target spatiotemporal resolution higher than a non-target spatiotemporal resolution used to encode remaining non-target view portions in the second video image that are outside the target view portion.

In block 408, the upstream device transmits, to the streaming client device, the second video image comprising the target view portion encoded with the target spatiotemporal resolution and the remaining non-target view portions encoded with the non-target spatiotemporal resolution via the video stream.

In an embodiment, the second video image is immediately subsequent to the first video image in a sequence of video images that are rendered to the viewer.

In an embodiment, the second video image is not immediately subsequent to the first video image in a sequence of video images that are rendered to the viewer.

In an embodiment, the target view portion in the second video image to be rendered at the second time point includes a foveal-view region that corresponds to a foveal view in a vision field of the viewer at the first time point as determined based on the target view direction of the viewer to the first video image rendered at the first time point; the target view portion to be rendered at the second time point includes a surround region spatially contiguous to but outside the foveal-view region of the target view portion.

In an embodiment, the upstream device is further configured to dynamically determine a spatial extent of the surround region in the second video image based at least in part on a transmission latency time.

In an embodiment, the upstream device is further configured to dynamically determine a spatial extent of the surround region in the second video image based at least in part on a variation in transmission latency time.

In an embodiment, the surround region is uniformly centered about the foveal-view region.

In an embodiment, the upstream device is further configured to dynamically determine a spatial extent of the surround region in the second video image based at least in part on a predicted eye gaze displacement.

In an embodiment, the predicted eye gaze displacement is determined based on an eye gaze velocity as determined from the view direction data received from the streaming client device. In an embodiment, the surround region is of an elongated shape emphasizing a direction of the predicted eye gaze displacement.

In an embodiment, the upstream device is further configured to dynamically determine a spatial extent of the surround region in the second video image based at least in part on one or more of: a transmission latency time, a variation in transmission latency time, a predicted eye gaze displacement, etc.

In an embodiment, the target view portion is non-overlapping with the remaining non-target view portions.

In an embodiment, the target view portion has one or more of: a different spatial shape, a different size, a different aspect ratio, etc., from the remaining non-target view portions.

In an embodiment, the target view portion is identified in image metadata encoded with the second video image in the video stream; the streaming client device is to use the image metadata to identify the target view portion from the remaining non-target view portions in the second video image.

In an embodiment, the target view portion is encoded in one or more first video sub-streams of the video stream; the remaining non-target view portions are encoded in one or more second different video sub-streams of the video stream.

In an embodiment, the upstream device is further configured to perform: based on second viewing tracking data received from the streaming client device after the second time point, determining a second target view direction of the viewer in relation to a second 3D scene depicted by the second video image (a) that has been streamed in the video stream to the streaming client device before the second time point and (b) that has been rendered with the streaming client device to the viewer at the second time point; identifying, based on the second target view direction of the viewer, a second target view portion in a third video image to be streamed in the video stream to the streaming client device before a third time point subsequent to the second time point and to be rendered at the third time point; encoding the second target view portion in the third video image into the video stream with the target spatiotemporal resolution higher than the non-target spatiotemporal resolution used to encode second remaining non-target view portions in the third video image that are outside the second target view portion; transmitting, to the streaming client device, the third video image comprising the second target view portion encoded with the target spatiotemporal resolution and the second remaining non-target view portions encoded with the non-target spatiotemporal resolution via the video stream.

FIG. 4B illustrates an example process flow according to an example embodiment of the present invention. In some example embodiments, one or more computing devices or components may perform this process flow. In block 452, a client device such as a video streaming client, decodes, before a first time point, a first video image from a video stream, the video stream being streamed by a video streaming server.

In block 454, while rendering the first video image at the first time point on a display device to a viewer, the client device collects viewing tracking data based on which a target view direction of a viewer in relation to a three-dimensional (3D) scene depicted by the first video image is to be determined.

In block 456, the client device sends, before a second time point subsequent to the first time point, the viewing tracking data to the video streaming server.

In block 458, the client device decodes, before the second time point, a second video image from the video stream, the second video image comprising a target view portion with a target spatiotemporal resolution higher than a non-target spatiotemporal resolution used to encode remaining non-target view portions in the second video image that are outside the target view portion, the target view portion in the second video image having been identified by the streaming server based on the target view direction of the viewer determined from the viewing tracking data sent to the video streaming server before the second time point.

In block 460, a client device causes at least a part of the target view portion in the second video image to be rendered, at the second time point, on the display device to the viewer.

In an embodiment, the part of the target view portion includes a foveal-view region that corresponds to a foveal view in a vision field of the viewer at the second time point.

In an embodiment, the client device is further configured to send viewport information to the streaming server. The viewport information is used by the streaming server as a basis to determine a size of the target view portion.

In an embodiment, the client device is further configured to decode image metadata from the video stream. The image metadata identifies the target view portion from the remaining non-target view portions in the second video image.

In an embodiment, the client device is further configured to perform: while rendering the second video image at the second time point on the display device to the viewer, collecting second viewing tracking data based on which a second target view direction of the viewer in relation to a second 3D scene depicted by the second video image; sending, before a third time point subsequent to the second time point, the second viewing tracking data to the video streaming server; decoding, before the third time point, a third video image from the video stream, the third video image comprising a second target view portion with the target spatiotemporal resolution higher than the non-target spatiotemporal resolution used to encode second remaining non-target view portions in the third video image that are outside the second target view portion, the second target view portion in the third video image having been identified by the streaming server based on the second target view direction of the viewer determined from the second viewing tracking data sent to the video streaming server before the third time point; causing at least a part of the second target view portion in the third video image to be rendered, at the third time, on the display device to the viewer.

In various example embodiments, an apparatus, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

9. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
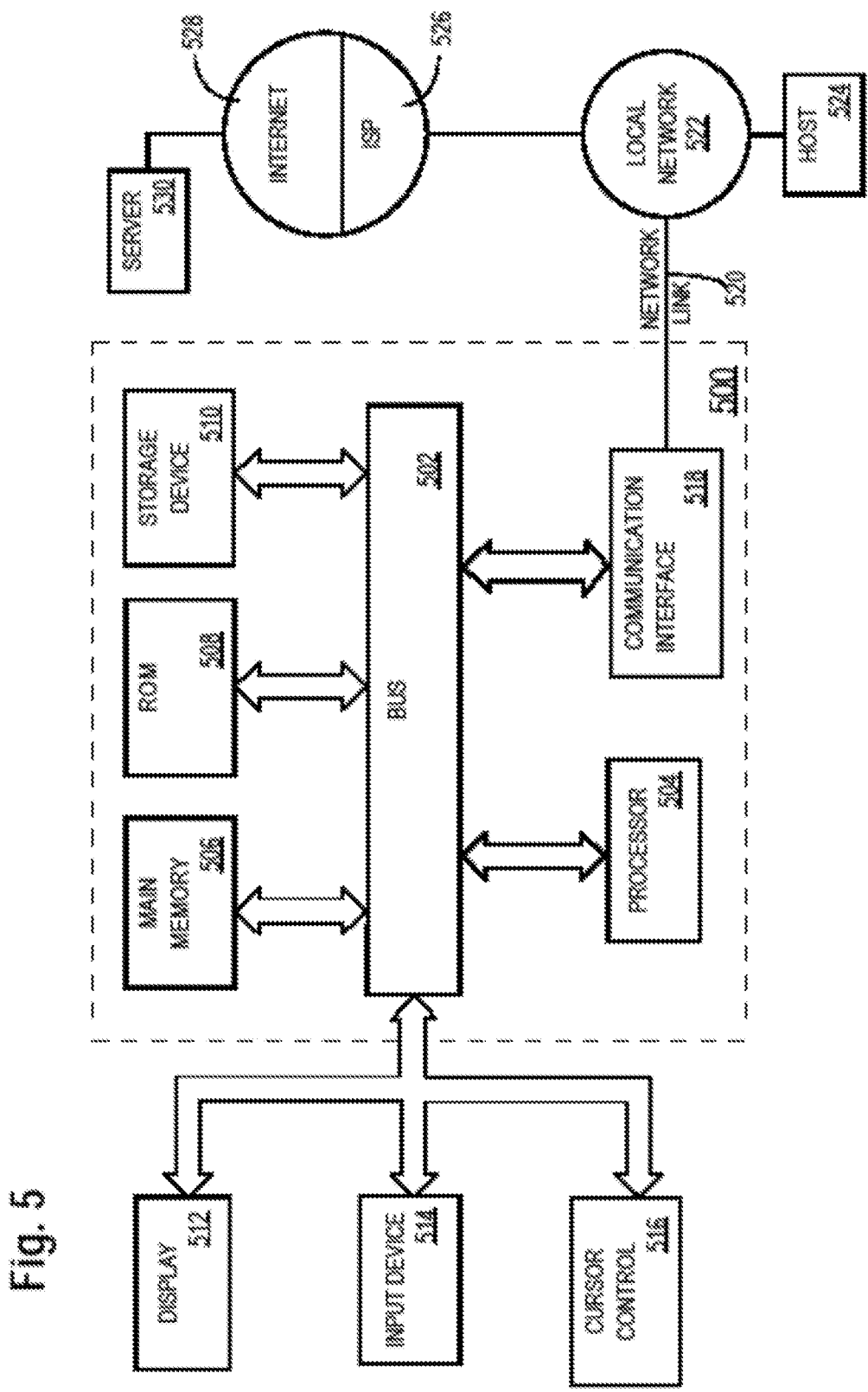
FIG. 5 illustrates an example hardware platform on which a computer or a computing device as described herein may be implemented.

For example, FIG. 5 is a block diagram that illustrates a computer system 500 upon which an example embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504.

A storage device 510, such as a magnetic disk or optical disk, solid state RAM, is provided and coupled to bus 502 for storing information and instructions.

Computer system 500 may be coupled via bus 502 to a display 512, such as a liquid crystal display, for displaying information to a computer viewer. An input device 514, including alphanumeric and other keys, is coupled to bus 502 for communicating information and command selections to processor 504. Another type of viewer input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510.

Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

10. Equivalents, Extensions, Alternatives and Miscellaneous

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for streaming video data, comprising:

based on viewing tracking data received from a streaming client device after a first time, determining a target view direction of a viewer in relation to a three-dimensional (3D) scene depicted by a first video image (a) that has been streamed in a video stream to the streaming client device before the first time point and (b) that has been rendered with the streaming client device to the viewer at the first time point;

identifying, based on the target view direction of the viewer, a target view portion in a second video image to be streamed in the video stream from a video streaming server to the streaming client device before a second time point subsequent to the first time point and to be rendered at the second time point;

wherein a spatial extent of a surround region covered by the target view portion in the second video image is determined based at least in part on a transmission latency time between the video streaming server and the streaming client device;

encoding the target view portion in the second video image into the video stream with a target spatiotemporal resolution higher than a non-target spatiotemporal resolution used to encode remaining non-target view portions in the second video image that are outside the target view portion;

transmitting, to the streaming client device, the second video image comprising the target view portion encoded with the target spatiotemporal resolution and the remaining non-target view portions encoded with the non-target spatiotemporal resolution via the video stream;

wherein the method is performed by one or more computing devices.

2. The method of claim 1, wherein the second video image is immediately subsequent to the first video image in a sequence of video images that are rendered to the viewer.

3. The method of claim 1, wherein the second video image is not immediately subsequent to the first video image in a sequence of video images that are rendered to the viewer.

4. The method of claim 1, wherein the target view portion in the second video image to be rendered at the second time point includes a foveal-view region that corresponds to a foveal view in a vision field of the viewer at the first time point as determined based on the target view direction of the viewer to the first video image rendered at the first time point, and wherein the surround region is spatially contiguous to but outside the foveal-view region of the target view portion.

5. The method of claim 4, further comprising dynamically determining a spatial extent of the surround region in the second video image based at least in part on a variation in transmission latency time.

6. The method of claim 4, where the surround region is uniformly centered about the foveal-view region.

7. The method of claim 4, further comprising dynamically determining a spatial extent of the surround region in the second video image based at least in part on a predicted eye gaze displacement.

8. The method of claim 7, where the predicted eye gaze displacement is determined based on an eye gaze velocity as determined from the view direction data received from the streaming client device.

9. The method of claim 7, where the surround region is of an elongated shape emphasizing a direction of the predicted eye gaze displacement.

10. The method of claim 4, further comprising dynamically determining a spatial extent of the surround region in the second video image based at least in part on one or more of: a transmission latency time, a variation in transmission latency time, or a predicted eye gaze displacement.

11. The method of claim 1, wherein the target view portion is non-overlapping with the remaining non-target view portions.

12. The method of claim 1, wherein the target view portion has one or more of: a different spatial shape, a different size, or a different aspect ratio, from the remaining non-target view portions.

13. The method of claim 1, wherein the target view portion is identified in image metadata encoded with the second video image in the video stream; and wherein the streaming client device is to use the image metadata to identify the target view portion from the remaining non-target view portions in the second video image.

14. The method of claim 1, wherein the target view portion is encoded in one or more first video sub-streams of the video stream; and wherein the remaining non-target view portions are encoded in one or more second different video sub-streams of the video stream.

15. The method of claim 1, further comprising:
based on second viewing tracking data received from the streaming client device after the second time point, determining a second target view direction of the viewer in relation to a second 3D scene depicted by the second video image (a) that has been streamed in the video stream to the streaming client device before the second time point and (b) that has been rendered with the streaming client device to the viewer at the second time point;
identifying, based on the second target view direction of the viewer, a second target view portion in a third video image to be streamed in the video stream to the streaming client device before a third time point subsequent to the second time point and to be rendered at the third time point;
encoding the second target view portion in the third video image into the video stream with the target spatiotemporal resolution higher than the non-target spatiotemporal resolution used to encode second remaining non-target view portions in the third video image that are outside the second target view portion;
transmitting, to the streaming client device, the third video image comprising the second target view portion encoded with the target spatiotemporal resolution and the second remaining non-target view portions encoded with the non-target spatiotemporal resolution via the video stream.

16. A method for presenting video data to viewers, comprising:
wherein the method is performed by a streaming client device;
decoding, before a first time point, a first video image from a video stream, the video stream being streamed by a video streaming server to the streaming client device;
while rendering the first video image at the first time point on a display device to a viewer, collecting viewing tracking data based on which a target view direction of a viewer in relation to a three-dimensional (3D) scene depicted by the first video image is to be determined;
sending, before a second time point subsequent to the first time point, the viewing tracking data to the video streaming server;
decoding, before the second time point, a second video image from the video stream, the second video image comprising a target view portion with a target spatiotemporal resolution higher than a non-target spatiotemporal resolution used to encode remaining non-target view portions in the second video image that are outside the target view portion, the target view portion in the second video image having been identified by the streaming server based on the target view direction of the viewer determined from the viewing tracking data sent to the video streaming server before the second time point;
wherein a spatial extent of a surround region covered by the target view portion in the second video image is determined based at least in part on a transmission latency time between the video streaming server and the streaming client device;
causing at least a part of the target view portion in the second video image to be rendered, at the second time point, on the display device to the viewer;
wherein the method is performed by one or more computing devices.

17. The method of claim 16, wherein the part of the target view portion includes a foveal-view region that corresponds to a foveal view in a vision field of the viewer at the second time point.

18. The method of claim 16, further comprising sending viewport information to the streaming server, wherein the viewport information is used by the streaming server as a basis to determine a size of the target view portion.

19. The method of claim 16, further comprising decoding image metadata from the video stream, wherein the image metadata identifies the target view portion from the remaining non-target view portions in the second video image.

* * * * *